June 21, 1960

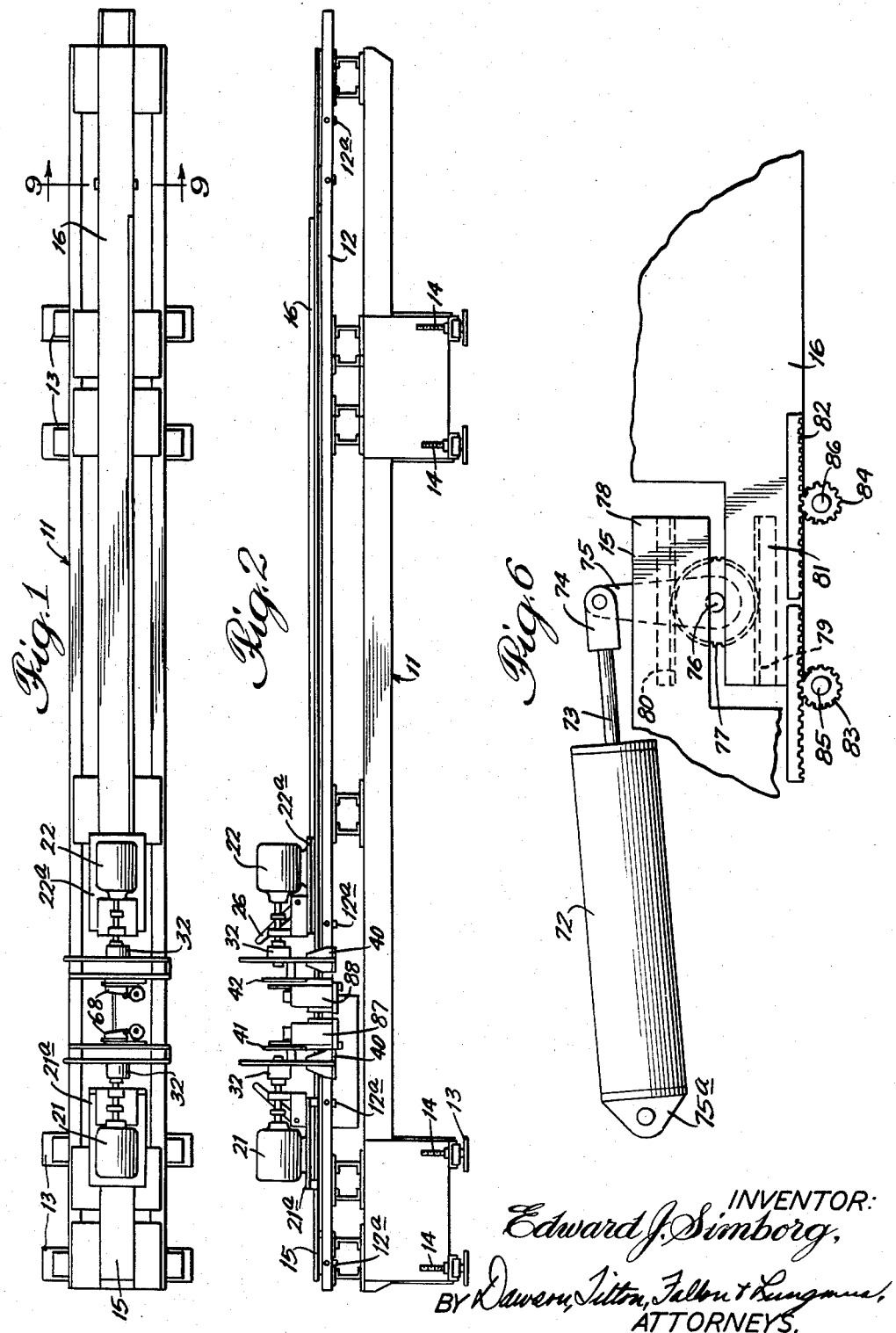

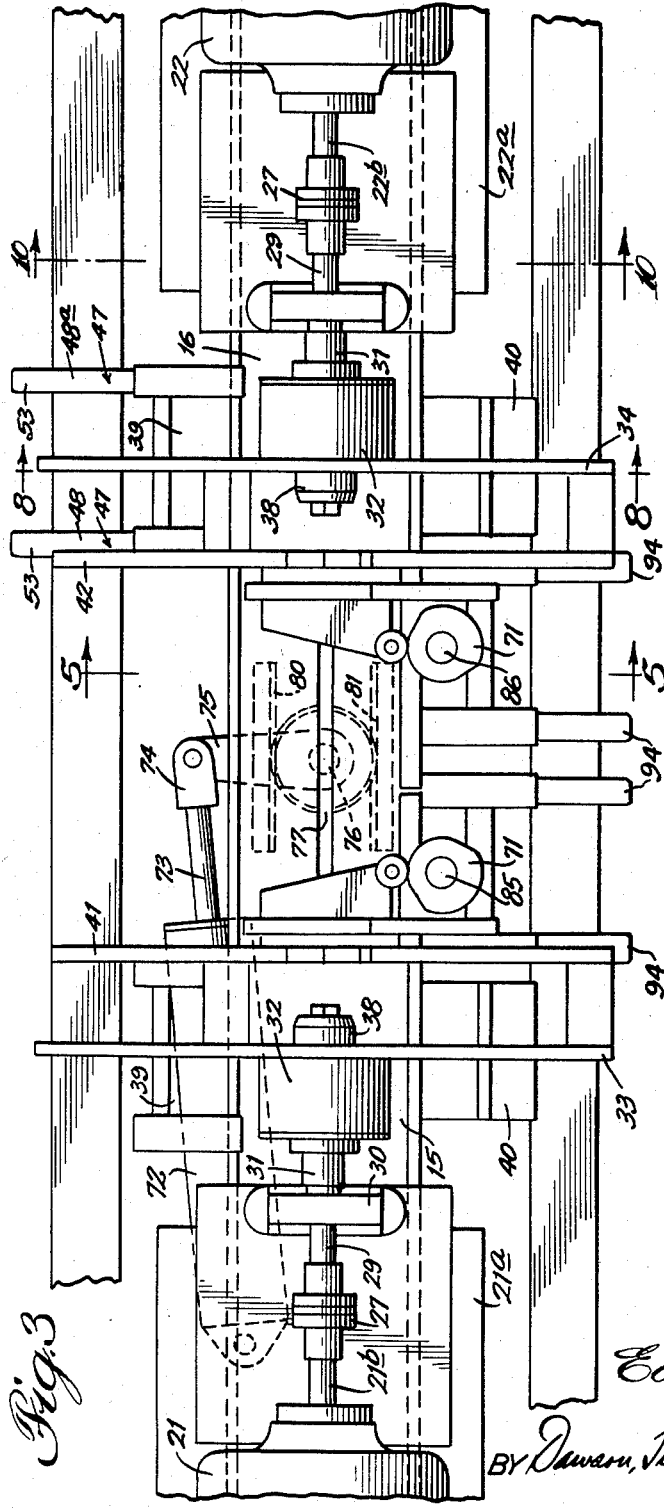

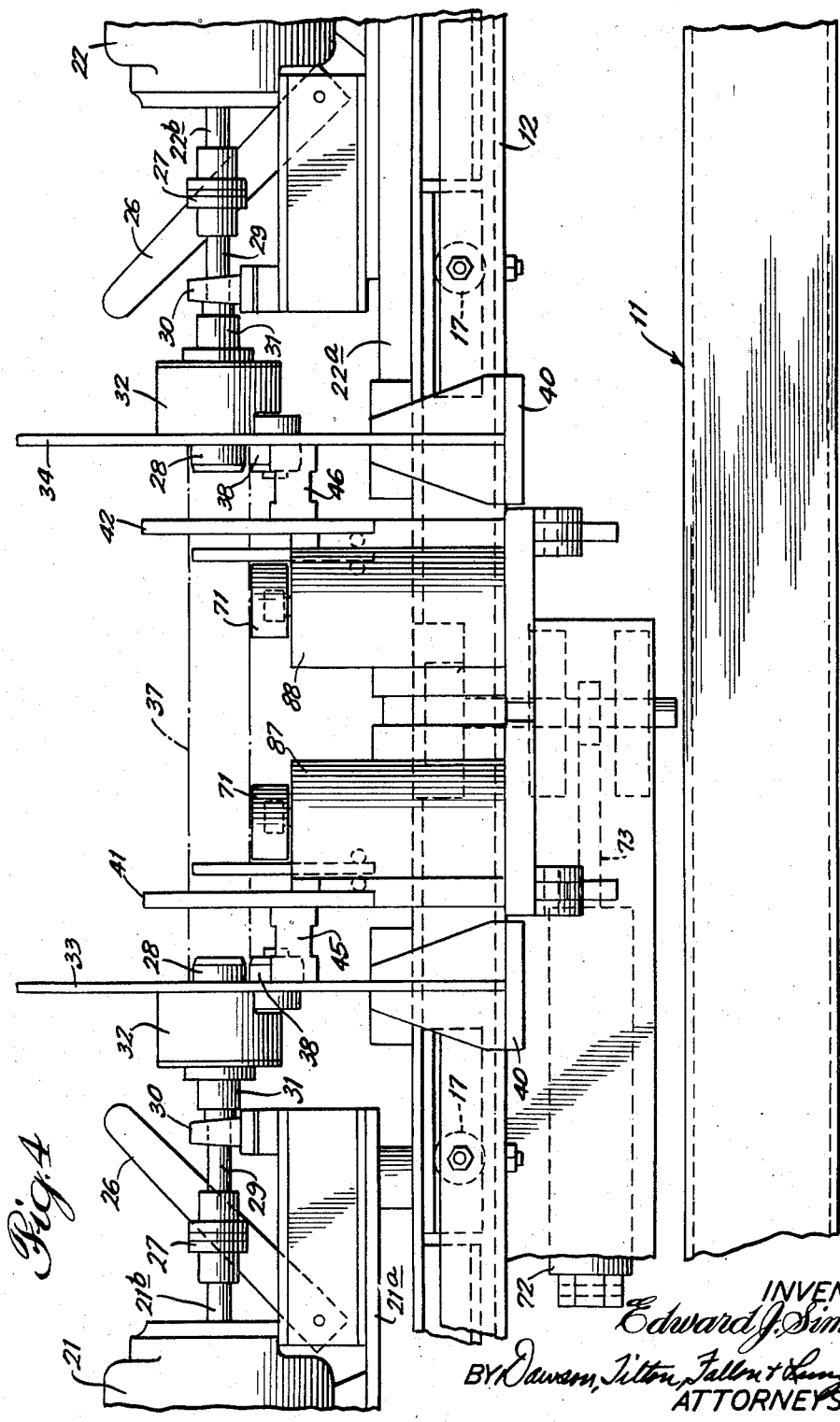

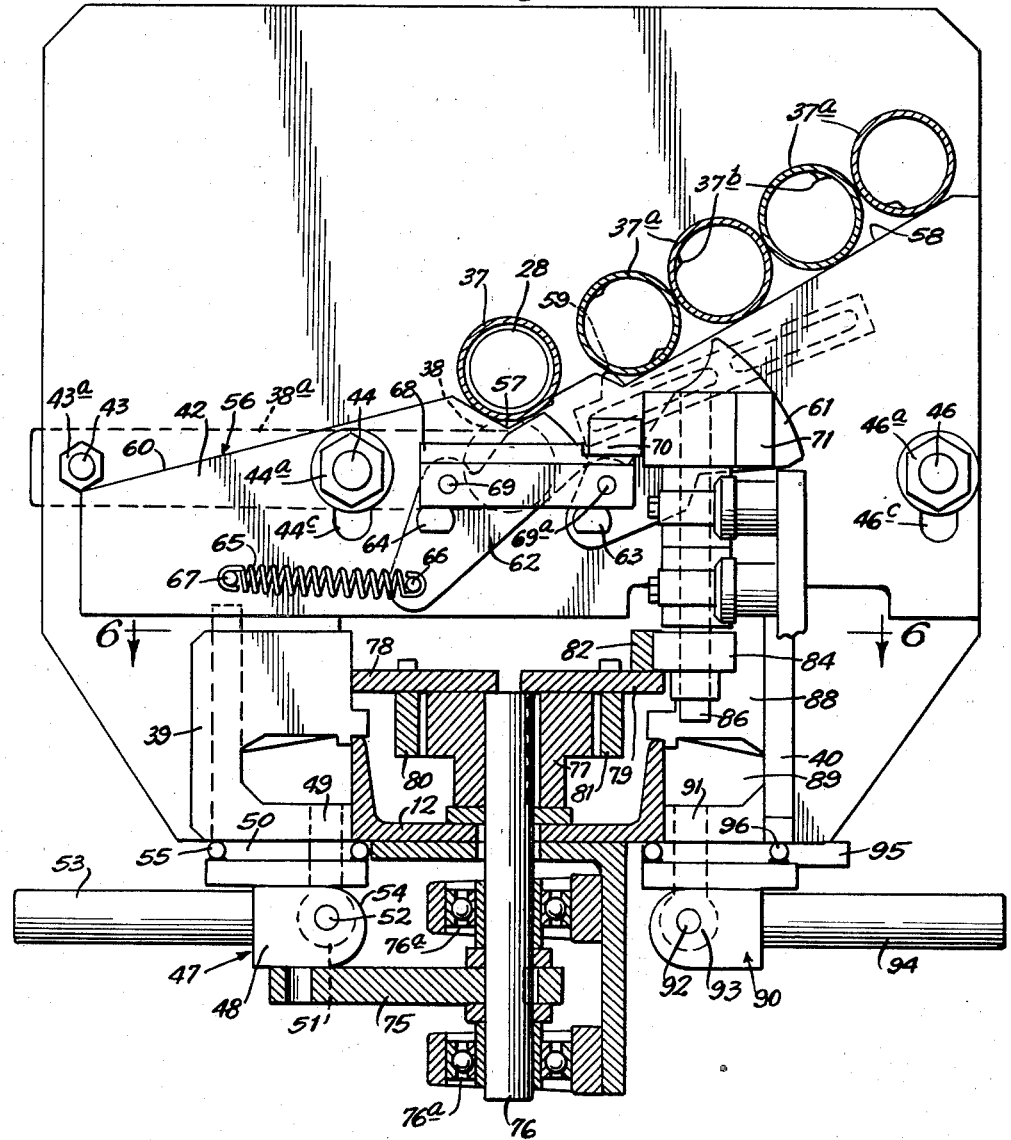

E. J. SIMBORG 2,941,567

TUBE FORMING APPARATUS

Filed June 27, 1958

INVENTOR:
Edward J. Simborg,
BY Dawson, Tilton, Fallon & Lungmus,
ATTORNEYS.

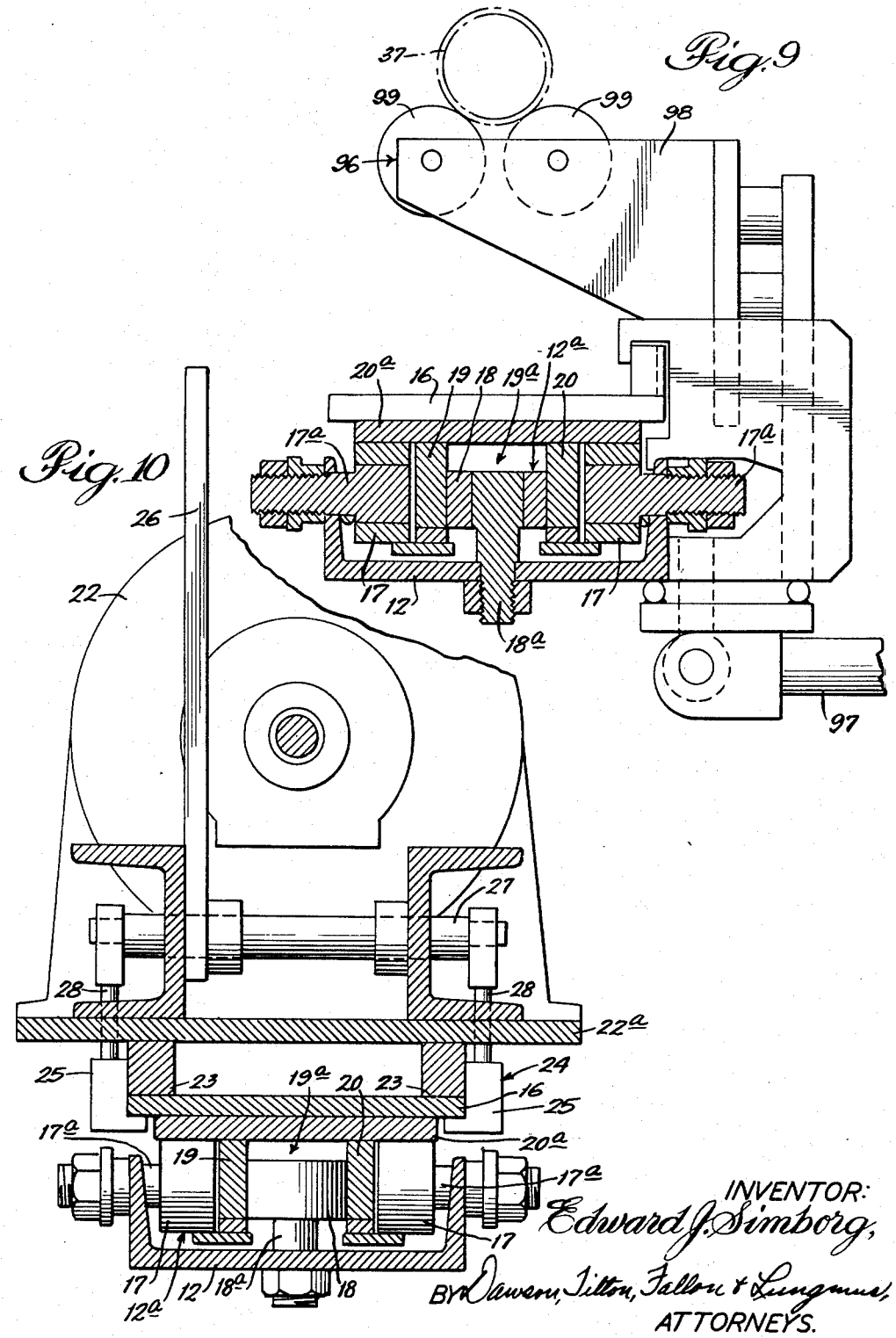

United States Patent Office 2,941,567
Patented June 21, 1960

1

2,941,567

TUBE FORMING APPARATUS

Edward J. Simborg, Chicago, Ill., assignor to International Rolling Mill Products Corporation, Chicago, Ill., a corporation of Illinois Filed June 27, 1958, Ser. No. 745,160

8 Claims. (Cl. 153—54)

This invention relates to tube forming apparatus and, more particularly, to a machine effective to change the configuration of ends of tubes.

The apparatus of this invention finds utility in tube rolling mills where a tube is continuously formed by developing a continuous strip of metal into a circular shape in cross-section, as by rolling. As the completed tube (the longitudinally extending seam being continuously electrically welded) leaves the machine, it must be cut into prescribed lengths. A conventional way of cutting the continuously-issuing tube is to send it through a punch where the tube is sheared off into the proper lengths. These punches result in deforming the tube in the vicinity of the shear so that the desired uniform circularity is missing, especially at the ends of the tube. Additionally, the cutting operation is productive of burrs or other fragments which are naturally undesirable in a finished tube.

It is a general object of this invention to provide an apparatus for forming the ends of tubes. Another object is to provide a machine that reshapes the ends of tubes into a circular configuration and at the same time removes any undesirable burrs, fragments, etc. Still another object is to provide a machine for shaping the ends of tubes which is equipped to handle a large number of tubes in short order with the shaping operation being performed automatically and exactly from tube to tube. Yet another object is to provide a machine for shaping the ends of tubes in which novel loading and unloading means for the tubes are provided.

A further object is to provide a machine for the shaping of tube ends in which the machine is readily adjustable to handle tubes of different lengths and/or different sizes. Still further objects and advantages of this invention can be seen as this specification proceeds.

The invention will be described in conjunction with an illustrated embodiment shown in the accompanying drawing, in which—

Figure 1 is a plan view of a machine embodying the teachings of this invention;

Figure 2 is a side elevational view of the machine seen in Figure 1;

Figure 3 is an enlarged fragmentary plan view of the machine seen in Figure 1;

Figure 4 is an enlarged framentary side elevational view of the machine seen in Figure 2;

Figure 5 is a cross-sectional view taken along the line 5—5 of Figure 3;

Figure 6 is a fragmentary sectional view taken along the line 6—6 of Figure 5;

Figure 9 is an enlarged transverse sectional view taken along the line 9—9 of Figure 1; and

2

Figure 7:
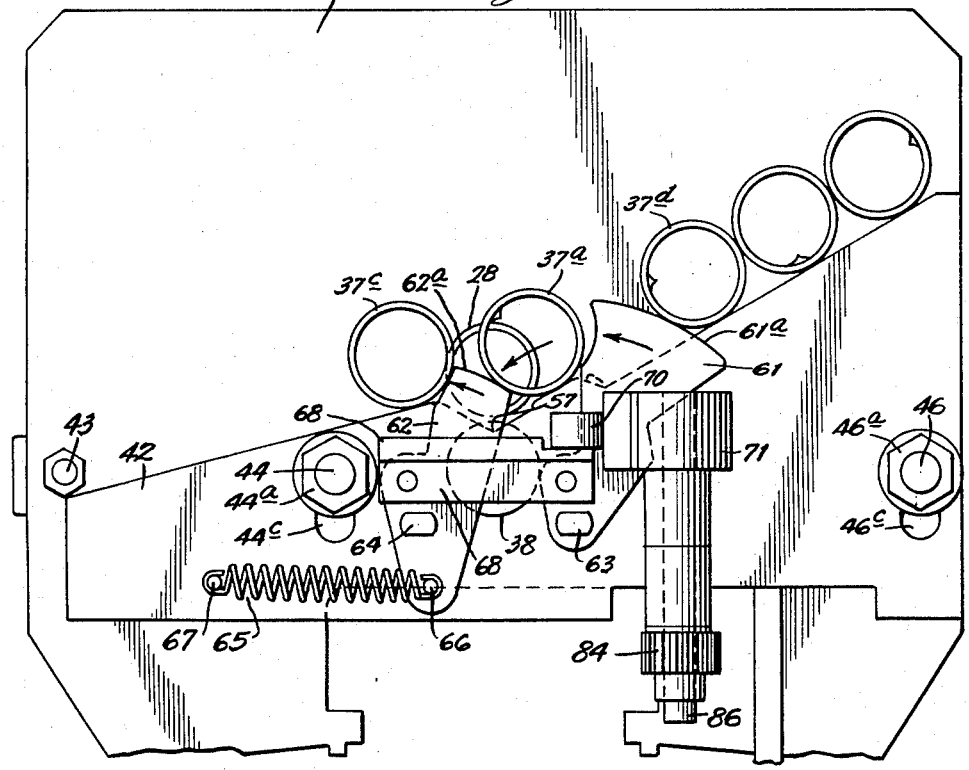
Figure 7 is a view similar to that seen in Figure 5 but showing the various machine elements in different operative condition.

Figure 10 is an enlarged transverse sectional view taken along the line 10—10 of Figure 3.

In the illustration given, and referring at the outset to Figures 1 and 2, the numeral 11 designates generally an elongated base of a tube forming machine. The uppermost member of the base (designated 12 in Figures 2, 9 and 10) is a longitudinally-extending channel which serves as an elongated guide for the movable parts of the machine. The base 11 also includes supports 13 (seen only in Figures 1 and 2) which serve to maintain the guide 12 at an elevation above the floor. Supports 13 include vertically adjustable supporting posts 14 which can be employed for leveling of the machine.

Movably mounted in guide 12 are two pedestals 15 and 16. For the most part, pedestals 15 and 16 are the same except that pedestal 16 is substantially longer than pedestal 15. The movable mounting of the pedestals 15 and 16 in guide 12 can be most quickly appreciated from a consideration of Figures 9 and 10 which are cross-sectional views through the portion of the machine in which pedestal 16 is located. In Figures 9 and 10, guide 12 is seen to be equipped with a bearing unit generally designated 12a and which includes three rollers or wheels, two of which have their axles disposed horizontally and are designated by the numeral 17, while the third has its axle disposed vertically and is designated by the numeral 18. The axles for wheels 17 and 18 are designated by the numerals 17a and 18a, respectively, and are mounted within the side and bottom walls, respectively, of guide 12. Pedestals 15 and 16 (pedestal 16 only being seen in Figures 9 and 10) are equipped with spaced-apart, depending wall elements 19 and 20 which are generally L-shaped in cross-section and which bear against wheels 17 and 18 thereby permitting the pedestals 15 and 16 to reciprocate within guide 12. Wheels 17 support the weight of pedestals 15 and 16 on their upper surfaces, a slight space existing between the bottom surface of wheels 17 and the base portions of the L-shaped depending walls 19 and 20 being present to prevent inadvertent displacement of the pedestals from the guide. The pedestals are maintained against undesirable transverse movement within guide 12 by the rolling action of the wheels 18 between depending walls 19 and 20. Walls 19 and 20 are spaced apart a distance slightly greater than the diameter of wheels 18 to permit the necessary rolling action of wheels 18. Depending walls 19 and 20 can be conveniently provided as an assembly, generally designated 19a, secured to pedestal 16 by means of plate 20a. Inasmuch as the pedestals move only a short distance in the end-forming operation, generally just a matter of inches, the assemblies 19a, including top walls 20a and depending walls 19 and 20, need only extend for a short portion of the length of the pedestal and overlap the bearing units 12a at the longitudinal ends thereof.

Guide 12 is provided with four bearing units 12a of the character seen in Figures 9 and 10, two for each pedestal 15 and 16, as can be seen in Figure 2. Two such bearing units 12a have been found entirely satisfactory to support a pedestal fourteen feet six inches long. Where pedestal 16 is of such length, pedestal 15 may be four feet four inches long in a machine having an over-all length of nineteen feet, thereby permitting two inches of reciprocatory movement between the two pedestals 15 and 16 for the tube end-forming operation. By adjusting the location of the motor units 21 and 22 which are positionably supported on pedestals 15 and 16 respectively, tubes having lengths ranging between one foot six inches to about twelve feet three inches can be satisfactorily end-formed.

Each motor unit 21 and 22 is mounted on a base plate, 21a and 22a respectively. As can be best seen in Figure 10 where only motor unit 22 is seen, the base 22a is slidably mounted on pedestals 16 as at 23, and locking means in the form of a clamping unit, generally designated 24, is provided. Clamping unit 24 includes a pair of gibs 25 which are adapted to be pressed upwardly against the undersurface of pedestal 16. Upward movement of gibs 25 is achieved through the rotation of clamp handle 26 acting through clamp shaft 27 which is eccentrically connected to linkages 28, linkages 28 being secured to gibs 25. From this, it is to be appreciated that the motor units can be positioned at a number of points along the length of the pedestals to provide for the accommodation of different length tubes. Generally, however, only motor unit 22 need be repositioned on pedestal 16 to yield a desired spacing.

Each motor unit 21 and 22 is equipped with an extended shaft 21b and 22b, respectively (best seen in Figures 3 and 4), which shafts are connected through couplings 27 to tube forming members 28 which may take the form of rolls. A shaft 29 connecting each roll 28 with its associated coupling 27 is journaled in a bearing 30 mounted on the associated motor unit support plate 21a or 22a, as the case may be. Shafts 29 are equipped with bushings 31 which in turn carry rolls 28. The bushings 31 are supported in annular roller bearings (not shown) but which are housed in bearing housings 32 mounted on hopper sidwalls 33 and 34 associated with motor units 21 and 22 respectively.

Figure 8:
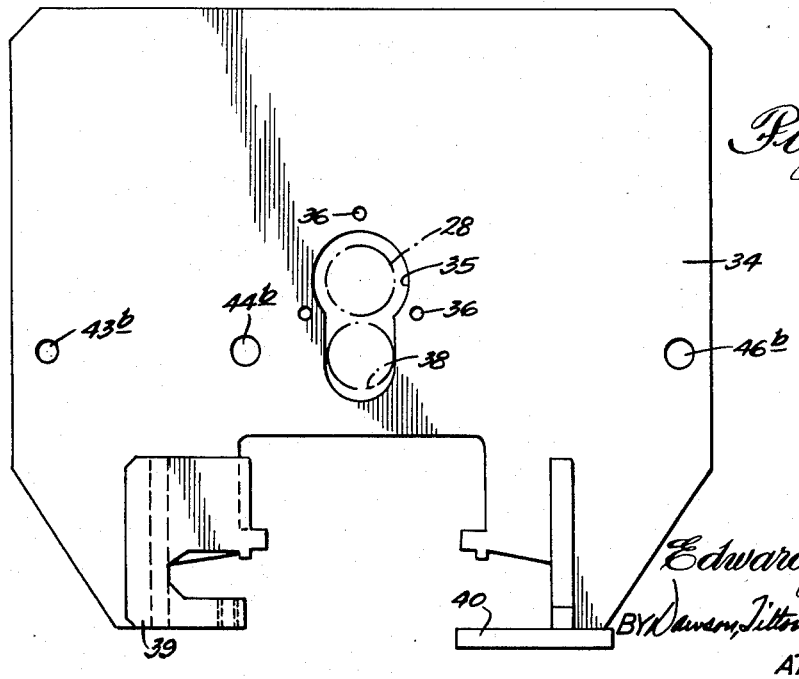
Figure 8 is a sectional view taken along the line 8—8 of Figure 5.

The hopper sidewall 34 associated with motor unit 22 is seen in elevation in Figure 8 and roller 28 is shown in doted line positioned within a central aperture 35 in hopper side wall 34. A corresponding structure is provided for hopper side wall 33 and the bearing housing 32 in each case is secured to the associated hopper side wall by means of bolts extending through bolt holes 36 (seen only in Figure 8). As can be best appreciated from Figure 4, the rolls 28 extend a short distance into the ends of a tube 37 (shown in dotted line) and cooperate with outer rolls 38 to form the ends of a tube 37. Rolls 38 are rotatably mounted on shafts (not shown) secured to hopper side walls 33 and 34. Thus, the end of a tube confined between rolls 28 and 38 is returned to a truly circular configuration under the influence of driven roll 28 which is driven by its associated motor unit, 21 or 22 as the case may be.

Hopper side plates 33 and 34 are equipped with guide bearing brackets 39 and guide openings 40 which, as can be seen in Figure 5, bear against guide channel 12. In the operation of the machine on a given length of the tube 37, hopper side plates 33 and 34 remain stationary as do rolls 38, while rolls 28 reciprocate after each tube 37 is end-formed. During the removal of roll 28 from a tube 37 after the end-forming step, the hopper side plates 33 and 34 cooperate with roll 28 to provide a stripping action on tube 37 so as to readily disengage roll 28 from tube 37. When a longer tube 37 is to be end-formed, hopper side plates 33 and 34 can be positioned at the proper place on guide 12, a sliding relationship existing between brackets 39 and openings 40 of hopper side plates 33 and 34 and guide channel 12. Immobilization of hopper side plates 33 and 34 is achieved through clamping devices 47, to be described hereinafter.

Cooperating with hopper side plates 33 and 34 in defining a hopper for the support of tubes to be end-formed and which also rigidify the hopper structure and provide additional support for rolls 38 are tube rails 41 and 42 which are rigidly connected with plates 33 and 34, respectively. Tube rail 42 can be seen in elevation most clearly in Figures 5 and 7.

Each bottom roll 38 is rotatably mounted on an arm 38a, arm 38a being secured to a hopper end plate (34 as seen in Figure 5) by means of a stud 43 maintained against axial movement by nut 43a. Arm 38a is also secured to both end plate 34 and tube rail 42 by means of a second stud 44 held in place against tube rail 42 by means of nut 44a. The end plates and tube rails associated with each motor unit are also connected by studs 46 (seen in Figures 4, 5 and 7). Suitable lock nuts 46a are provided to cooperate with the intermediate shoulders on studs 46 to further aid in maintaining the end plates 33 and 34 at the proper spaced distance from tube rails 41 and 42, respectively. Stud 46 can be seen in side elevation in Figure 4 where it is to be noted that stud 46 is provided with intermediate, enlarged portions bearing against the adjacent surfaces of end plate 34 and tube rail 42 to cooperate with the spaced-apart nuts (not shown) to maintain end plates 34 and tube rail 42 in spaced relation. A similar stud 45 is provided between end plate 33 and tube rail 41 associated with motor unit 21 (the right-hand unit in Figure 4), stud 45 also serving to carry an arm 38a which in turn supports a roll 38 in a manner analogous to that just described.

Studs 43, 44 and 46 extend through openings 43b, 44b and 46b, respectively, in end plate 34, as can be appreciated from Figure 8. Studs 44 and 46 which connect and support tube rail 42 on end plate 34 extend through slots 44c and 46c, respectively, in tube rail 42, as can be appreciated from a consideration of Figures 5 and 7. By loosening nuts 44a and 46a, tube rail 42 can be moved vertically relative to side plate 34 and thus accommodate different diameter tubes, as will be explained hereinafter.

The positioning of the end plates 33 and 34, and therefore the tube rails 41 and 42, along the length of guide channel 12 is achieved through the use of clamps generally designated 47, only the clamps 47 associated with end plate 34 being seen in the drawing. In Figure 3 the clamps 47 associated with end plate 34 can be seen, one being designated 48 and one being designated 48a. For simplifying the drawing, the clamps associated with end plate 33 have been omitted but are identical.

Clamp 48 is seen in end elevation in Figure 5 and includes a stud 49 which is threadably received in the guide bearing bracket 33 provided integral with end plate 34. Slidably mounted on stud 49 intermediate the ends thereof is a clamp member 50. The lower end of stud 49 is enlarged and equipped with an eye 51. A transverse shaft 52 is rotatably mounted within eye 51 and keyed to a handle 53, the outer contour of handle 53 being formed into a cam surface as at 54. Thus, rotation of handle 53 urges clamp member 50 upwardly and causes guide bearing bracket 39 to tightly engage guide channel 12. Clamp member 50 is equipped with a pair of longitudinally extending beads or ribs 55 which provide the clamping pressure against guide channel 12. The clamps 47 may be omitted from end plate 33 since the invention may be practiced with equal facility with end plate 33 and motor unit 21 stationary and only end plate 34 and motor unit 22 movable to accommodate different lengths of tubing 37 to be end-formed.

As also seen in Figure 5, tube rail 42 is equipped with an upper inclined surface generally designated 56. The upper surface 56 is provided with a central V-notch as at 57 in which tube 37 is lodged during an end-forming operation. By vertically positioning tube rail 42 as by loosening nuts 44a and 46a to locate studs 44 and 46 in different positions in slots 44c and 46c, the location of V-notch 57 relative to roll 28 can be changed to accommodate tubes of different diameters. In such a case, different sized rolls 28 may be employed if necessary. Also, arm 38a can be pivoted about stud 43 to change the position of roll 38 relative to roll 28 in aperture 35.

Also shown in Figure 5 are a plurality of as-yet uniformed tubes 37a which have their end side walls deformed as at 37b in a manner characteristic of the deformation produced by a punch-severing operation. Tubes 37a are maintained at an angle to each other and along an inclined portion 58 of inclined surface 56 which is separated from V-notch 57 by means of an upwardly protruding stop 59. Thus, tube 37 engaged by rolls 28 and 38 is free to rotate without contacting the next tube 37a to be end-formed. On the downward side of V-notch 57 another inclined portion 60 of inclined surface 56 is provided that permits an end-formed tube 37c to roll off the machine, as can be readily appreciated from a consideration of Figure 7 where a tube 37a is shown entering the V-notch 57 and a tube 37c is shown in the process of being discharged from V-notch 57.

The mechanism for causing a tube 37a to enter V-notch 57 and to cause an already end-formed tube 37c to leave V-notch 57 includes tube fingers 61 and 62 (seen best in Figures 5 and 7). Finger 61 is employed to introduce a tube 37a into V-notch 57, while finger 62 is employed to remove an already end-formed tube from the notch 57. The fingers are each constructed with a generally circular end, as at 61a and 62a respectively (Figure 7), so that during the rotation of the two fingers the tubes next to be handled by the fingers are maintained in spaced relation to the tube currently being handled. This can be best appreciated from a consideration of Figure 7 in which finger 61 is seen to be introducing the tube 37a into V-notch 57 while restraining a tube 37d from following closely behind tube 37a. The circular or curvilinear surface 61a permits easy passage of finger 61 past tube 37d while performing its operation of introducing tube 37a into V-notch 57. By the same token, the curved outer surface 62a of finger 62 restrains tube 37a from passing beyond V-notch 57 while finger 62 is in the process of removing tube 37c from V-notch 57.

Fingers 61 and 62 are pivotally mounted on studs 63 and 64, respectively, which are equipped with enlarged ends at one end and are rigidly connected as by a press fit into openings in tube rail 42 and secured therein by jam nuts (not shown). Return movement of the fingers from the position shown in Figure 7 to the inoperative position of Figure 5 is accomplished by means of a tension spring 65 interconnected between one end of finger 62, as at 66, and tube rail 42, as at 67. Fingers 61 and 62 are interconnected by means of a linkage 68 which includes shafts 69 and 69a which are secured within linkage 68 and on which fingers 61 and 62 are pivotally mounted.

Linkage 68, and here it is to be appreciated that two such linkages are provided as can be appreciated from a consideration of Figure 1 (one for each pedestal), also carries a cam roller 70 rotatably mounted thereon. Under the influence of a cam 71, cam roller and therefore linkage 68 is reciprocated transversely of the machine, as can be seen from a consideration comparison of Figures 5 and 7. This reciprocating action causes the fingers to pivot in such a manner as to introduce and eject tubes from the V-notch 57, a tube in the V-notch 57 being aligned with roll 28 and in position for end forming.

In the illustration given, the movement of cam 71 is provided through the mechanism by which pedestal 16 is moved, it being understood that the fingers 61 and 62 operated through cam 71 only needing to be actuated whenever a tube change is required. For a change of tubes to occur, the pedestals 15 and 16 move away from each other so as to disengage the rolls 28 from the ends of the tube 37 just end-formed, and thereby permit ejecting of that tube and introduction of a yet to be formed tube 37a.

One mechanism for achieving the reciprocation of pedestals 15 and 16 relative to each other for the purposes just given, can be seen in Figure 6 in which a fluid-actuated cylinder 72 is seen equipped with a piston rod 73, the outer end of which is equipped with a clevis 74. The cylinder 72 is pivotally mounted on frame 11, as at 75 (see only in Figure 3), and which utilizes an apertured leg 75a on the non-piston rod end of cylinder 72. Clevis 74 is pivotally connected to an arm 75 which in turn is keyed to a pinion shaft 76 carrying a pinion gear 77.

As seen in Figure 5, pinion shaft 76 is supported for rotation in bearings 76a which, in turn, are supported on guide channel 12.

Pedestals 15 and 16 (as can be seen best in Figure 6) are equipped with mating offset extensions 78 and 79 respectively, the adjacent faces of which are equipped with racks 80 and 81 respectively. Thus, reciprocation of piston rod 73 within piston 72 causes a rotation of pinion 77 which, depending upon the direction of the pinion rotation, either causes pedestals 15 and 16 to approach or move away from each other.

Pedestal 16 is also equipped with a second rack 82 which engages pinions 83 and 84 mounted on shafts 85 and 86 respectively, all of which can be readily seen in Figure 6. Shafts 85 and 86 also carry cams 71 which are operative to activate fingers 61 and 62.

Shafts 85 and 86 are rotatably carried in support brackets 87 and 88, respectively (best seen in Figures 2 and 4). Each bracket 87 and 88 is equipped with a jaw-forming opening as at 89 which can be seen in Figure 5 in conjunction with bracket 88. A clamping device 90 is seen in Figure 5 which is the equivalent to clamps 47 employed in connection with securing end plate 33 in position on guide channel 12. Clamping mechanism 90 includes a stud 91 threadably received within bracket 88 and which carries at its unsecured end a shaft 92 through an eye 93. Keyed to shaft 93 is handle 94 which can be made to bear against a bearing plate 95 equipped with beads 96 and which forces the upper part of opening 89 into immovable relation with guide channel 12.

Figure 9 shows a tube support structure, generally designated 96, which is movably mounted on channel guide 12 and can be locked in place by a clamping mechanism 97 of the character just described in order to support a tube 37 at a point intermediate motor units 21 and 22 when the length of tubing 37 is quite extensive—as would be the case when motor unit 22 were located fairly well to the right in Figures 1 and 2 and quite remote from motor unit 21. Intermediate support unit 96 is equipped with a bracket 98 rotatably carrying a pair of wheels 99 on which tube 37 is supported. Bracket 98 carries clamp 97 on only one side thereof to permit ready relocation of the intermediate support unit 96 as desired.

It is believed that a description of the operation of the machine will be helpful in understanding the cooperation of the various elements thereof in the end-forming of a tube. For that purpose, such a description follows.

Operation

As point out above, in many tube manufacturing operations, the ends of the tubes become deformed such as occurs during the shearing off of the continuously produced tube into proper lengths. For this reason, it is desirable to reform the tube into a truly circular shape. However, it is to be appreciated that other end-forming operations can be performed by the machine, depending upon the character of the heads or rolls employed for the elements designated 28 and 38 in the illustration given. In the typical end-forming operation, a plurality of tubes having end deformations are placed on incline surface 56, as seen in Figure 5. A conveyor (not shown) can be employed for bringing the tubes from the cutting station for this purpose. As a tube 37a in Figure 5 is about to undergo the end-forming operation, the piston rod 73 moves in a fluid-actuated cylinder 72 to turn pinion 76 and move pedestals 15 and 16 away from each other while being guided in guide channel 12 by means of wheels 17 and 18. The movement of pedestals 15 and 16 causes rack 82 to turn pinions 83 and 84 which tin turn induce rotation of cams 71. Cams 71 urge linkages 68 to the right from the position shown in Figure 5 and into the position shown in Figure 7. The movement to the right of linkage 68 induces rotation of fingers 61 and 62 about their pivot points 63 and 64 to simultaneously eject a just end-formed tube 37c from V-notch 57 and to introduce a yet to be formed tube 37a thereinto. The contour of cams 71 is so arranged that cams 71 do not cause the movement of linkages 68 until rollers 28 have been disengaged from tube 37. The contour of cams 71 is also so arranged that when tube 37a has been moved toward projection 59 and tube 37c has been moved to a position on inclined portion 60 of the incline surface 56 of the tube rails 41 and 42 (the condition seen in Fig. 7), the tension spring 65 takes over and returns the fingers to the position shown in Figure 5. Thereafter, the pedestals 15 and 16 continue their movement toward each other and cause rolls 28 to enter the ends of a tube 37. Cooperating in achieving ready entry of the heads 28 into a tube 37 are the beveled end portions provided on rolls 28. When the rolls 28 are fully introduced within the ends of a tube 37, the cylinder 72 no longer moves piston rods 73 and the pedestals are immobilized. At this point, a signal, as from a limit switch or the like, can be conveyed from cylinder 72 to motor units 21 and 22 causing them to rotate rolls 28 for a predetermined time period. During the rotation of rolls 28, the ends of the tube 37 are confined between rolls 28 and lower rolls 38 which are positioned below rolls 28. At the end of the prescribed period of rotation, the motor units 21 and 22 can be stopped and the cylinder 72 can be energized to move pedestals 15 and 16 apart from each other.

It is to be appreciated that by positioning rolls 38 below rolls 28, and providing for the retraction of rolls 28, a tube 37 can be readily introduced and ejected from the tube end-forming station without interfering with any of the machine parts.

When it is desired to end-form tubes of different lengths from that for which the machine was set, it is only necessary to pivot clamp handles 53 and 94 upwardly to loosen brackets 39 and 88, respectively, and to pivot handle 26 to release motor unit 22 from its position on pedestal 16. Thereafter the motor unit and brackets which support the fingers, tube rails, and end plates can be relocated to a new position corresponding to the length of a new tube to be end-formed. If the tube is of considerable length, the intermediate support unit 96 can be located intermediate the tube rails 41 and 42 to prevent undue deflection of a tube when supported therebetween.

To accommodate different diameter tubes, the locknuts on studs 43, 44, 45 and 46 can be loosened, thus freeing tube rails 41 and 42 for vertical movement relative to side plates 33 and 34 respectively. This also permits repositioning of roll 38 in aperture 35 by pivoting arm 38a about stud 43. Subsequent tightening of the nuts will secure the various elements in position to handle different diameter tubes.

While in the foregoing specification a detailed description of an embodiment of the invention has been given for the purpose of understanding the invention, it will be apparent to those skilled in the art that many variations in the details thereof may be made without departing from the spirit and scope of the invention.

I claim:

1. In a machine for forming the ends of tubes, a longitudinally extending base providing a guide, pedestals mounted in said guide for movement relative to each other, a motor unit on each pedestal with the shafts thereof in axial alignment, at least one of said motor units being positionable along its associated pedestal at various distances from the other motor unit, means for simultaneously oppositely reciprocating said pedestals, said shafts each being equipped at their adjacent ends with a roll adapted to enter an end of a tube to be formed, a transverse wall positionably clamped on said base adjacent the roll provided on the positionable motor unit, said transverse wall being apertured for movement of its associated roll therethrough, a second transverse wall adjacent the other roll and also being apertured for movement of said other roll therethrough, each of said walls carrying a cooperating roll having its axis parallel to and below the axis of the shaft-mounted rolls, said cooperating rolls extending through apertures in the respective walls, a pair of spaced-apart transversely inclined tube rails positioned between said transverse walls, each of said tube rails being rigidly anchored to its adjacent wall, said rails being equipped with a tube-receiving recess in the upper inclined surface thereof aligned with the apertures in said walls, a pair of fingers pivotally mounted on each of said guide rails and operative to sequentially introduce and remove tubes relative to said aligned recesses, and means for pivoting said fingers, said pivoting means being operatively connected to the means for reciprocating said pedestals.

2. In tube forming apparatus, an elongated base providing a longitudinally-extending guide, a pair of pedestals mounted in said guide for movement relative to each other, a motor-equipped support unit on each of said pedestals, means for reciprocating said pedestals toward each other, the motors of said units being equipped with extended shafts in coaxial relation, each shaft being equipped with a tube-engaging roll at the end thereof to aid in forming a tube introduced into said apparatus, a pair of longitudinally spaced-apart hopper side walls mounted on said base between said support units, each of said walls having an opening therein for receiving the roll of a support unit adjacent thereto, transversely inclined tube rails mounted on said base between said walls, said hopper and rails providing a tube trough in the inclined portion thereof aligned with said rolls, said rails being equipped with tube-admitting and tube ejecting means, and an idler roll mounted on each hopper side wall adjacent the opening therein and cooperating with the adjacent motor shaft roll to form the ends of the tube ensleeved over said adjacent shaft roll.

3. The structure of claim 2 in which the said idler rolls are positioned below the said shaft rolls.

4. The structure of claim 2 in which the said tube rails are each equipped with a V-shaped notch aligned with said shaft rolls, and finger means on said rails for moving tubes sequentially into and out of said V-shaped notch.

5. The structure of claim 4 in which the said finger means includes fingers pivotally mounted on said rails for movement in a path transverse to said base, said fingers being equipped with curvilinear ends to restrain a successive tube from contacting a tube being moved into said V-shaped notch.

6. In a machine for forming the ends of tubes, a longitudinally-extending base providing a guide, a pair of spaced-apart pedestals mounted in said guide for movement relative to each other, means for oppositely simultaneously reciprocating said pedestals, a forming roll mounted on each pedestal adapted to be inserted into the end of a tube, means for rotating said forming rolls, a pair of transverse walls interposed between said pedestals, said walls being spaced apart by a distance equal to the length of the tube being formed on said machine, tube guide rails between said walls and anchored thereto, each of said tube guide rails having an upper surface angularly upwardly inclined and equipped with a tube-receiving notch in the upper inclined surface thereof aligned with said forming rolls, said walls being apertured in alignment with said forming rolls, idler rolls in said walls adjacent the aperture therein spaced from said forming rolls in a direction transverse to the length of the machine a distance equal to the wall thickness of the tube being formed on the machine, and tube introduction and ejection means positioned between said tube guide rails operative to introduce and eject tubes sequentially relative to said notch.

7. The structure of claim 6 in which said pedestals are equipped with a pair of depending L-shaped walls received within said guide, said guide being equipped with wheel means received in each of said L-shaped depending walls and between the spaced-apart depending walls to confine said pedestals within said guide during longitudinal movement thereof.

8. The structure of claim 6 in which the means for reciprocating said pedestals includes a pinion gear mounted centrally in said guide, means on said base for rotating said pinion, said pedestals being equipped with inner side walls adjacent said pinion gear, said inner side walls being equipped with gear rack means, said gear rack means cooperating with said gear to produce the opposite reciprocatory motion of said pedestals, at least one of said pedestals being equipped with a gear rack on the outer side wall thereof engageable with a second pinion gear rotatably mounted on said base, a cam coupled to said second pinion gear, and linkage means reciprocably mounted on said base for movement transverse of said base and being urged against said cam, said linkage means carrying finger means operative to selectively position a tube in alignment with said forming rolls.

References Cited in the file of this patent

UNITED STATES PATENTS

| 379,307 | Codling | Mar. 13, 1888 |
| 1,471,032 | Johnson | Oct. 16, 1923 |
| 2,235,083 | Poole | Mar. 18, 1941 |
| 2,581,928 | Broden | Jan. 8, 1952 |

FOREIGN PATENTS

| 415,637 | Great Britain | Aug. 30, 1934 |